UNITED STATES PATENT OFFICE.

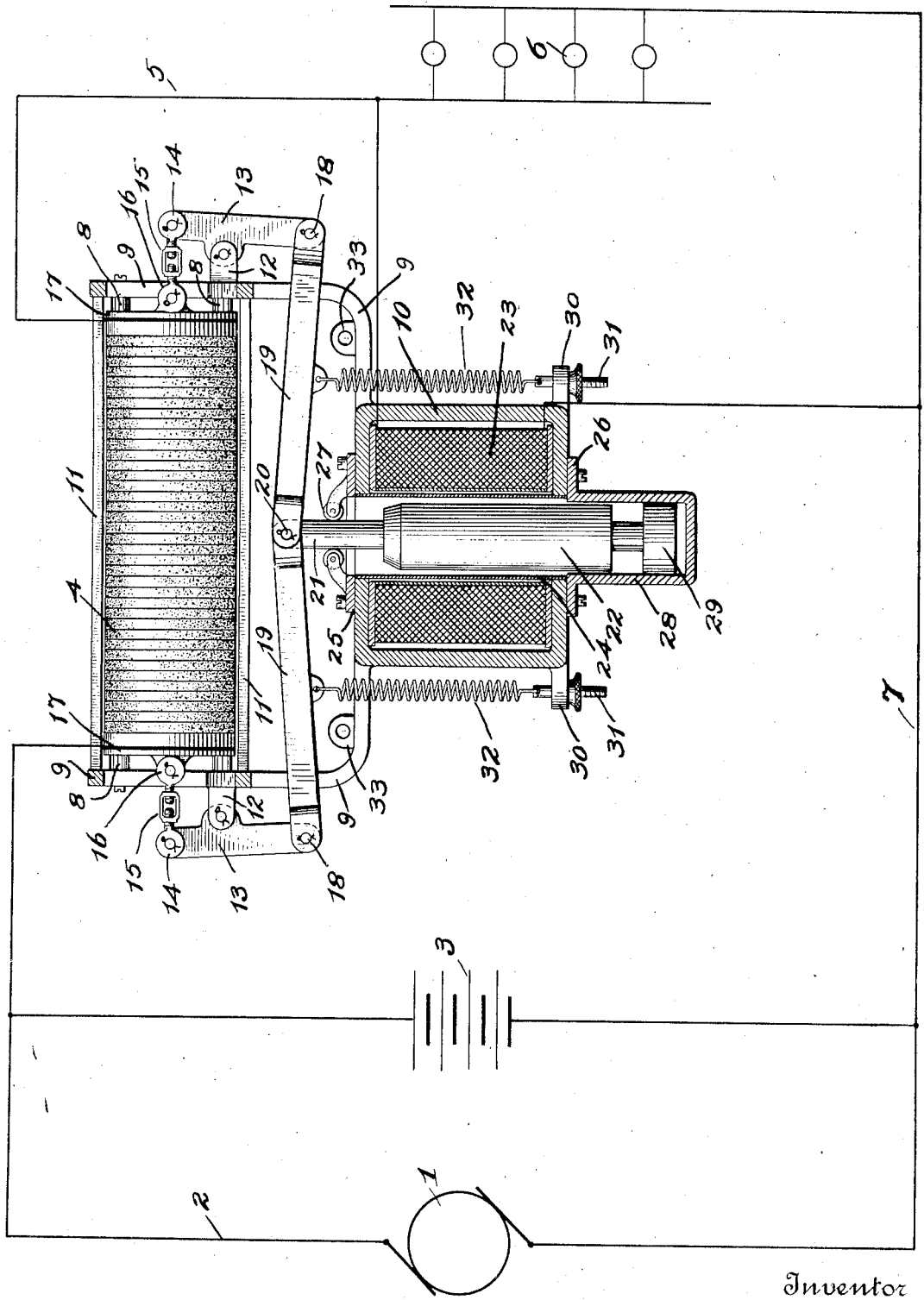

JOHN L. CREVELING, OF WHITE PLAINS, NEW YORK, ASSIGNOR TO GOULD COUPLER COMPANY, A CORPORATION OF NEW YORK.

ELECTRIC REGULATOR.

1,412,272.  Specification of Letters Patent. Patented Apr. 11, 1922.

Application filed October 7, 1916. Serial No. 124,354.

*To all whom it may concern:*

Be it known that I, JOHN L. CREVELING, a citizen of the United States, residing in White Plains, county of Westchester, and State of New York, have invented certain new and useful Improvements in Electric Regulators, of which the following is a description.

My invention pertains to that class of electric regulators wherein it is desired to regulate the current in a circuit or the voltage impressed upon a circuit, and has for a particular object to provide means whereby this will be accomplished automatically. A further object of my invention is to provide such a regulator which will operate to perform its function within very narrow limits of variation, and at the same time to provide a regulator having but few parts of rugged construction. A further object of my invention is to provide a regulator which, though delicate, will require the consumption of a small amount of energy for its operation, and wherein the standard of regulation will be maintained substantially uniform throughout wide variations in temperature.

As my invention is particularly applicable to systems of electrical distribution wherein a dynamo or generator is used to charge a storage battery and operate lamps or other translating devices in conjunction therewith, and wherein it is desired to hold upon the translating devices a substantially constant electromotive force irrespective of variations in electromotive force necessary to charge the battery which at times supplies the said translating devices, it will be described with reference to such a system.

In the drawing, 1 represents a dynamo or generator of any suitable type having its positive brush connected as by wire 2 with the positive side of the storage battery 3 and one end of the carbon pile 4, the opposite end of which is connected as by wire 5 with the positive terminals of the lamps or other translating devices indicated at 6. The negative terminals of the translating devices 6, storage battery 3 and generator 1 are all connected through the instrumentality of wire 7. It will be obvious that the electromotive force impressed upon the translating devices 6 may be controlled by controlling the resistance of the carbon pile 4, which in turn may be controlled by properly manipulating the pressure upon the said pile. The pile 4 is supported upon insulating rods 8, which I usually make four in number, two only showing in the drawing, while the other or front pair are carried by a portion of the structure removed for the sake of clearness in illustration. The rods 8 are carried by a frame work 9 which is preferably of iron cast integrally with the magnet frame 10. The upper portions of the frame work 9 are preferably united by members 11, which may be cast integrally therewith to insure rigidity of construction. The frame 9 has cast therewith bosses 12 which pivotally support the levers 13 provided at their upper extremities with links 14 adjustably connected as by turn-buckles 15 with the links 16 which are united to the end blocks 17 between which the carbon pile 4 may be compressed by separating the lower or longer extremities of the levers 13. The lower extremities of the levers 13 are pivotally connected as at 18 with the members 19 pivotally united as at 20 to form a toggle joint, the knuckle of which is pivotally united with the rod 21 carrying the core of iron or other magnetic material 22 surrounded by the winding or solenoid 23. The winding 23 is held in proper position within the magnet frame 10 as by means of a slip tube 24 which may be held in proper position between the plate 25 and flange 26. The plate 25 is provided with arms and antifriction rollers 27 which hold the rod 21 and the upper portion of the core 22 in proper alignment with respect to the bore of the magnet frame 10. The flange 26 carries a suitable dashpot cylinder 28 within which is fitted the plunger 29 which serves to hold the lower portion of the core 22 in proper alignment and prevent too sudden movement of the same. The magnet frame structure has cast integrally therewith lugs or bosses 30 through which adjusting screws 31 pass and engage the springs 32 connected with the members 19 as indicated, and normally tend to draw the said members downwardly in such manner as to cause the toggle joint to force the lower ends of the levers 13 apart and increase the pressure upon the carbon pile 4 and decrease the resistance thereof. The magnet frame casting is also preferably provided with any suitable type of lugs or other attachment devices whereby the entire regulator may be held in place, as indicated at 33. As the regulator shown in the drawing is one designed to hold the voltage upon the translating devices 6 constant, the operating winding 23 is preferably of fine wire and in shunt across the wires 5 and 7 of the translating circuit, as shown.

In practice I prefer to make the lower portions of the levers 13 long, as compared with the upper portions, so as to increase the leverage upon the pile, which under the majority of its operating conditions causes a considerable variation in resistance in its circuit upon slight changes in motion, even though the required changes in pressure are often considerable; and by means of the toggle joint composed of the members 19 I produce the greatest pressure per unit of movement of the knuckle of the joint when the carbon pile is near its maximum compression, and at which time very small movements of the ends of the pile toward each other require great increases in pressure. In order to make my solenoid as powerful as possible throughout the range that its core must necessarily travel, I prefer to make the core tapered slightly at its upper end, in such manner that, as it approaches the upper portion of the magnet frame 10 and thus diminishes the air gap and becomes more and more powerful, this will be in approximately or substantially the same ratio as the tension upon the springs increases, due to the upward movement of the levers 19, and also as any assistance due to the elasticity of the pile falls off. I readily make the proper adjustments with regards the position of the knuckle joint 20 and parts cooperating therewith by properly adjusting the turn-buckles 15. As a further refinement or improvement upon the regulator as above described, I also prefer to so proportion the various parts that the ordinary expansion of the pile 4 due to the heating of the same under continued operation will, by causing the levers 13 to swing their lower portions together, thus elevate the knuckle at 20 so that the air gap will be slightly smaller when the pile 4 is heated, and in this way compensate for the drop in current in the coil 23 due to its increased resistance caused by the heat effects in the coil. That is, I so construct my regulator that when the voltage across the translating devices is at its lowest and the pile 4 is compressed to its maximum, the toggle joint comprising the members 19 will exert a very powerful pressure per unit of pull exerted by the springs 32, owing to the fact that the angle between the members 19 is fast approaching 180°. As the voltage tends to rise above the normal, coil 23 lifts the core 22 and first relieves the pressure upon the pile 4 at a slow rate, and then more rapidly as the core 22 is moved upwardly. As the core 22 moves upwardly, the tension of the springs 32 naturally will increase slightly, and as pressure upon the pile 4 is relieved, the elasticity of the said pile will cease to assist the coil 23 intending to lift the core 22; and, as this assistance falls off and the springs 32 draw a little harder, the core 22 approaches the upper portion of the opening in the magnet frame 10. And I so place the core and shape its upper portion that, as this motion diminishes the air gap between the core and the magnet frame, it will do so in such manner that the pull upon the core per unit of magnetomotive force increases in such manner as to tend to compensate for the variations in elasticity of pile 4 and springs 32, so as to maintain the standard of adjustment of the regulator approximately or substantially constant throughout its range of operation. I further improve the operation by compensating for temperature changes in the coil 23 as follows: As the coil 23 becomes heated, due to operation, its resistance, of course, will rise, and its effect will therefore be somewhat diminished; and as the operation of the regulator will also cause the pile 4 to become heated, and also the structure in the immediate vicinity of the same, I prefer to make the portions of the apparatus supporting the pile 4 all of cast iron or other metal having a low co-efficient of expansion, and I prefer to make the members 19 of a material having a higher co-efficient of expansion than the frame-work, and I utilize the expansion of the pile 4 and the members 19, due to the heat of operation of the regulator, to so alter its adjustment that it will operate when heated with the knuckle 20 at a little higher position than when the other conditions are the same and, therefore, by decreasing the air gap, I cause the magnet to operate in a more powerful field and by properly arranging the parts in this way compensate for the falling off in the strength of the magnet 23, due to temperature increases in the normal operation of the regulator.

I do not wish in any way to limit myself to any of the exact constructions or details of operation given above to illustrate one embodiment of my invention, for it will be obvious that wide departure may be made without departing from the spirit and scope thereof as set forth in the following claims.

What I claim is:

1. The combination with a regulating element the operation of which may be altered by variations in pressure thereupon, levers for exerting pressure upon both ends of said element, and a toggle joint uniting said levers whereby movement of the knuckle of said joint affects said element, of electromagnetic means for moving said knuckle in a straight line in one direction, and adjustable means tending to move the knuckle in a different direction and to confine its motion to a straight line.

2. The combination with a regulating element the operation of which may be altered by variations in pressure thereupon, levers for exerting pressure upon both ends of said element, and a toggle joint uniting said levers whereby movement of the knuckle of said joint affects said element, of electromagnetic means for moving said knuckle in one direction, and a plurality of cooperating resilient means tending to move the knuckle in a straight line in an opposite direction.

3. The combination with a regulating element the effect of which is varied by variations in pressure, means for controlling the pressure upon said element comprising a plurality of levers operating thereupon, a toggle joint cooperating with said levers, and electromagnetic means for moving the knuckle of said joint so arranged that expansion of said element affects the magnetic means to increase the effect of fluctuations of magnetomotive force therein.

4. The combination with a regulating element the effect of which is varied by variations in pressure, means for controlling the pressure upon said element comprising a plurality of levers operating thereupon, a toggle joint cooperating with said levers, and electromagnetic means for moving the knuckle of said joint so arranged that expansion of said element affects the magnetic circuit of the magnetic means to increase the effect of fluctuations of magnetomotive force therein in such degree as to compensate for temperature changes in the electromagnetic means.

5. The combination with a regulating element, of means for controlling said element comprehending electromagnetic means and means whereby expansion of said element assists the electromagnetic means and substantially nullifies the effect of temperature changes in the electromagnetic means.

6. The combination with a regulating element, of means for controlling said element comprehending electromagnetic means and means whereby expansion of said element assists the electromagnetic means and compensates for temperature changes therein.

7. The combination with a regulating element, of electromagnetic means for controlling the same affected by expansion of said element and arranged to compensate for temperature changes in said electromagnetic means.

8. The combination with a regulating element, of electromagnetic means and means whereby the same affects said element, all cooperating upon changes in temperature of said element to adjust the electromagnetic means to substantially compensate for temperature changes therein.

9. The combination with a regulating element, of electromagnetic means for controlling the same affected by expansion of said element and comprising an operating coil affected by temperature changes therein, said electromagnetic means being so arranged that the expansion of said element causes compensation for temperature changes in said coil.

10. The combination with a regulating element, of electromagnetic means for controlling the same comprising an operating coil affected by temperature changes therein and means whereby said coil affects the regulating element and expansion in said element affects the electromagnetic means to compensate for temperature changes in said coil.

11. The combination with regulating means, of electrically affected means for operating the same, both aforesaid means being affected by temperature changes incident to the normal operation thereof and so arranged with respect to each other that the said effects of temperature changes counteract each other.

12. The combination with regulating means, of electrically affected means for operating the same, both aforesaid means being affected by temperature changes incident to the normal operation thereof and so arranged with respect to each other that the said effects of temperature changes counteract each other and preserve a substantially constant operating adjustment of the regulator throughout a substantial part of the normal operation thereof.

JOHN L. CREVELING.